(12) United States Patent
Hunzinger

(10) Patent No.: US 7,333,026 B2
(45) Date of Patent: Feb. 19, 2008

(54) COLLABORATIVE MULTICAST FOR DISSEMINATION OF INFORMATION IN VEHICULAR AD-HOC NETWORKS

(75) Inventor: Jason F. Hunzinger, Escondido, CA (US)

(73) Assignee: DENSO Corporation, Kariya (JP)

( * ) Notice: Subject to any disclaimer, the term of this patent is extended or adjusted under 35 U.S.C. 154(b) by 169 days.

(21) Appl. No.: 11/170,677

(22) Filed: Jun. 29, 2005

(65) Prior Publication Data

US 2007/0001869 A1 Jan. 4, 2007

(51) Int. Cl.
*B60Q 1/00* (2006.01)
(52) U.S. Cl. ............... 340/903; 340/901; 340/902; 340/904; 340/436; 340/463
(58) Field of Classification Search ............ 340/903, 340/901, 902, 904, 436, 463
See application file for complete search history.

(56) References Cited

U.S. PATENT DOCUMENTS

| | | | |
|---|---|---|---|
| 6,246,955 B1 | 6/2001 | Nishikawa et al. | |
| 6,340,934 B1 | 1/2002 | Hisada | |
| 6,445,308 B1 | 9/2002 | Koike | |
| 6,707,378 B2 | 3/2004 | MacNeille et al. | |
| 6,765,495 B1 * | 7/2004 | Dunning et al. | 340/903 |
| 6,985,089 B2 * | 1/2006 | Liu et al. | 340/903 |

OTHER PUBLICATIONS

A. Ebner, "A Self-Organized Radio Network for Automotive Applications", Conference Proceedings ITS 2001, 8th World Congress on Intelligent Transportation Systems, Sydney, Australia, Oct. 2001.

F. Borgonovo, L. Capelli, M. Cesana, L. Coletti, "MAC for ad-hoc inter-vehicle network: services and performance", 58th IEEE Semi-annual Vehicular . echnology Conference, Oct. 6-9 2003, Orlando, Florida, USA.

Sze-cao Ni, cu-Chee . seng, cuh-Shyan Chen, Jang-Ping Sheu, ". he Broadcast Storm Problem in a Mobile Ad Hoc Network", MobiCom '99, Aug. 15-20 1999, Seattle, eashington, USA.

c. B. Ko and N. H. Vaidya, "Geocasting in Mobile Ad Hoc Networks: Location-Based Multicast Algorithms", at IEEE eorkshop on Mobile Computing Systems and Applications (eMCSA' 99), Feb. 1999.

H. Füßler, J. Widmer, M. Käsemann, M. Mauve, H. Hartenstein, "Beaconless Position-Based Routing for Mobile Ad-Hoc Networks", University of Mannheim, Germany, NEC Network Labs Europe, Heidelberg, Germany, Technical Report TR-03-001, 2003.

* cited by examiner

*Primary Examiner*—Tai Nguyen
(74) *Attorney, Agent, or Firm*—Harness, Dickey & Pierce, PLC

(57) ABSTRACT

A collaborative nomination algorithm is provided for disseminating information amongst a plurality of collaborating vehicles in an inter-vehicle communication network. The method includes: receiving an incoming vehicle communication message at a recipient vehicle from one of the collaborating vehicles; nominating one of the collaborating vehicles identified in the incoming vehicle communication message to broadcast a subsequent vehicle communication message; and transmitting an outgoing vehicle communication message from the recipient vehicle, where the outgoing vehicle communication message identifies the vehicle nominated to broadcast the subsequent vehicle communication message.

18 Claims, 5 Drawing Sheets

COLLABORATIVE MULTICAST FOR DISSEMINATION OF INFORMATION IN VEHICULAR AD-HOC NETWORKS

FIELD OF THE INVENTION

The present invention relates generally to inter-vehicle communication and, more particularly, to a collaborative multicast algorithm for disseminating information in an inter-vehicle communication network.

BACKGROUND OF THE INVENTION

Inter-vehicle wireless communication has the potential to considerably improve vehicle safety. Warning information such as emergency electronic brake light signaling, road condition warnings, or accident warnings can be transmitted directly to adjacent vehicles or passed on to more distant vehicles. The inherent broadcast nature of radio communication lends itself to multicast multi-hop implementations for vehicle safety. Cooperative collision warning or avoidance can be achieved through periodic multicast of vehicle vector information. A number of traffic safety forums such as the Vehicle Safety Communications Consortium (VSCC), the Federal Highway Administration (US DOT FHWA), and ISO (TC204 WG16) have identified high priority applications or scenarios based on injury or fatality statistics for example.

Ad hoc inter-vehicle communication has several advantages over infrastructure or cellular-based telematics communication methods including: (i) low latency communication, (ii) robustness due to multiple transmitter/forwarder or mesh topology, (iii) low cost unlicensed frequency band use, (iv) carrier independence, and (v) larger capacity due to spatial diversity and availability wherever equipped vehicles are. The coverage, robustness and latency benefits are particularly important, if not uniquely important, for safety applications.

However, mobile ad hoc networks present particular challenges including (a) routing, whether unicast or multicast, in dynamic topologies, (b) contention avoidance and (c) synchronization without a centralized synchronization and access management function, and (d) retaining low latency over relatively long distance multi-hop packet routes. High densities of vehicles present particular challenges for synchronization and contention management while low densities of vehicles present particular challenges for routing. Latency challenges exist both in sparse networks and dense networks. Sparse networks present latency issues due to indirect routing or fragmented networks. High-density networks also present latency concerns due to contention and shared bandwidth for multiple applications. The performance of inter-vehicle networks under low and high traffic density of equipped vehicles will determine the feasibility of such systems and is a critical concern due to the long time-frame required to reach critical mass and maturity.

Therefore, it is desirable to provide an inter-vehicle communication approach that addresses these and other challenges associated with such systems.

SUMMARY OF THE INVENTION

A collaborative nomination algorithm is provided for disseminating information amongst a plurality of collaborating vehicles in an inter-vehicle communication network. The method includes: receiving an incoming vehicle communication message at a recipient vehicle from one of the collaborating vehicles; nominating one of the collaborating vehicles identified in the incoming vehicle communication message to broadcast a subsequent vehicle communication message; and transmitting an outgoing vehicle communication message from the recipient vehicle, where the outgoing vehicle communication message identifies the vehicle nominated to broadcast the subsequent vehicle communication message.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
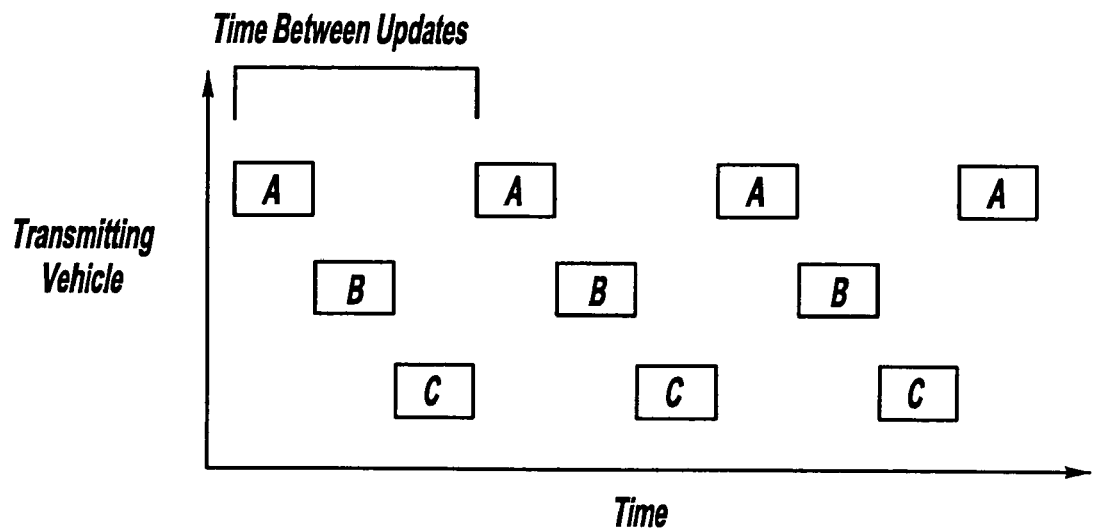
FIG. 1 is a diagram illustrating the transmission pattern when vehicles independently transmit vehicle status information.

Acting independently in a best-case scenario, vehicles may transmit their status vector as depicted in FIG. 1 where the update rate, i.e. the rate at which a particular vehicle's status is broadcast, is clearly much less than the packet rate.

Figure 2:
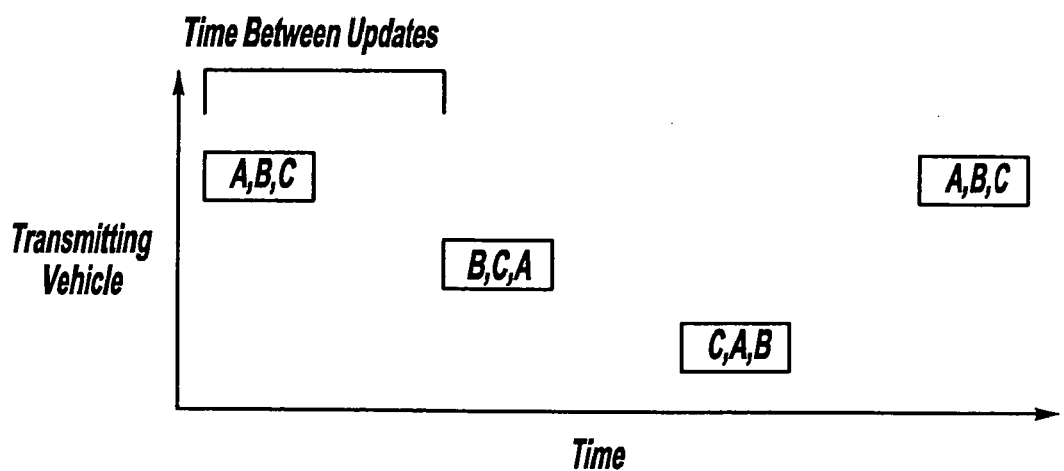
FIG. 2 is a diagram illustrating the transmission pattern when vehicles collectively transmit vehicle status information.

In contrast, vehicles may transmit collective information (i.e. status vectors of other vehicles) in addition to their own reference status. The collective information is overheard and cached from previous recent transmissions. Thus, each vehicle acts as a representative in turn. Since each vehicle transmits collective information, the overall update rate can be maintained with far fewer transmissions per vehicle as depicted in FIG. 2. This approach serves as the basis for a collaborative nomination multicast algorithm as will be further explain below.

VSCC has proposed a preliminary vehicle-to-vehicle data message set requirement that includes the following basic elements along with a vehicle identifier (such as a 48-bit communication address or license plate number) and time stamp: (i) position (GPS coordinates), (ii) velocity (heading & speed) and (iii) acceleration. Each of these indications can be represented as relative differences from a reference vehicle. With the possible exception of acceleration, the difference between the parameters for a set of collaborating vehicles can be much smaller than the absolute values. Note that the transmitting vehicle need not be the reference vehicle. It may be preferable to use the vehicle, for which the delta's of other vehicles can be expressed in the most compact form, as the reference.

In addition, VSCC proposes various data that could be used to predict a vehicle's future position: (i) steering wheel angle, (ii) throttle position, (iii) turn signal status, (iv) yaw-rate, and (v) brake position. It is also conceivable that these parameters are relatively similar in value between a set of adjacent vehicles although there may be a delay between them.

In a simple transmission, the transmitted packet contains information for only the transmitting vehicle and is referred to herein as an individual packet. The typical minimal content of an individual packet includes an identifier for the transmitter and at least some vehicle information (unless inherent from the transmission).

Figure 3:
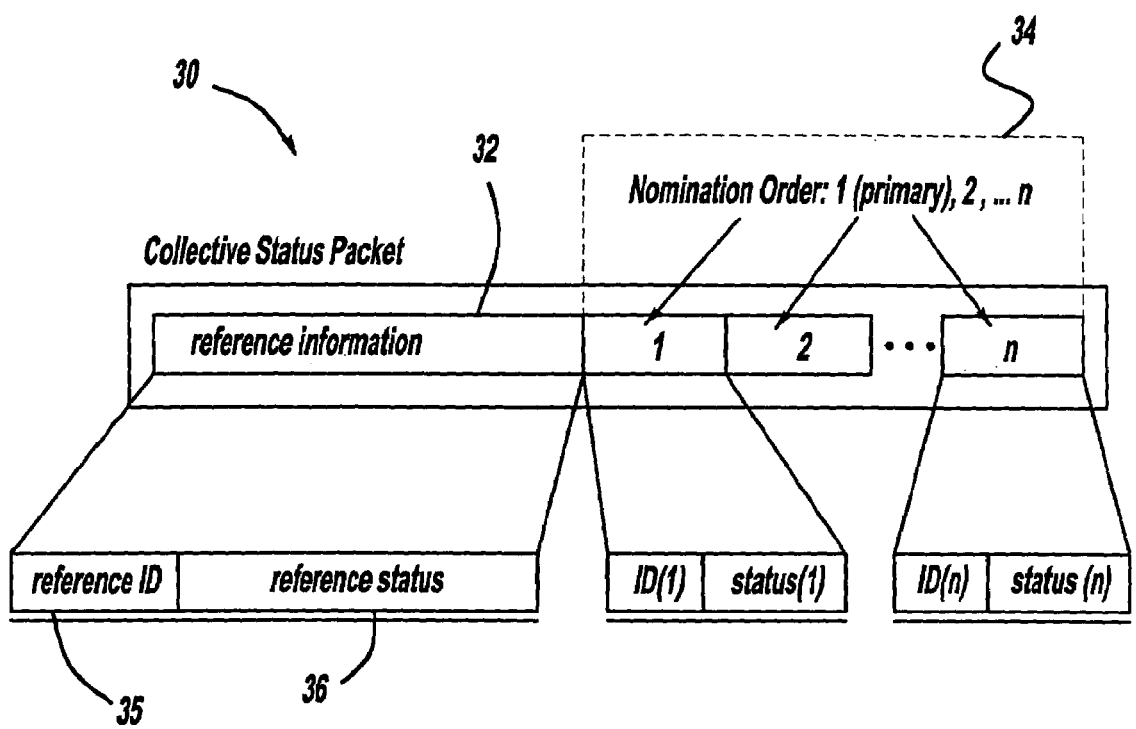
FIG. 3 depicts an exemplary collective packet according to the principles of the present invention.

FIG. 3 depicts an exemplary collective packet 30 according to the principles of the present invention. A collective packet 30 generally contains information for multiple vehicles with common or closely related information. In this, example, the collective packet 30 includes a reference section 32 and a differential section 34 referred to as a Δ-list. The reference section 32 resembles an individual packet's contents. The reference section 32 contains the identification of the transmitter 35 and its status information 36 that acts as a reference for reporting the status of other vehicles that share a common or similar status. The status of each of the other vehicles is described in the Δ-list. The Δ-list identifies all the other vehicles whose status is reported in the packet. The status information of each of the other vehicles is condensed to include only information that identifies differences from the reference status. If the status is the same as the reference, then no status need be included.

The size of a collective packet that incorporates status vectors of n neighbors is much less than n times the size of an individual packet. This is due to two factors: headers and overhead as well as the number of bits required to represent relatively small delta values compared to absolute values. A good example is absolute versus relative latitude and longitude values or GPS measurements.

Determining the status vectors for other vehicles may require the representative to extrapolate or otherwise compute an estimate of the current status of those other vehicles based on previously received (and time stamped) vectors. For example, a representative may extrapolate the current position of a neighbor vehicle by computing the location that the neighbor would currently be at if the previously reported velocity and/or acceleration was maintained.

A vehicle transmitting a collective packet is called a representative. The representative vehicle may not always be the same vehicle but may change over a period of time. Using the same vehicle over any extended period of time presents a number of potentially critical problems including: (i) power consumption, (ii) dated vectors of other vehicles, (iii) dated situational awareness, and (iv) limited coverage. Conversely, alternating vehicles has several advantages including: (i) increased coverage range/area, (ii) decreased power usage per vehicle, (iii) increased efficiency when status changes are taken into account, and (iv) increased efficiency when situational changes are taken into account.

Determination of the method of alternating representative is a challenge because inter-vehicle communication naturally requires self-organization in the absence of wide-area infrastructure coverage. The present invention uses a cooperative contention avoidance approach that allows vehicles to designate a nomination of the preferred next transmitter based on channel and neighbor history information available to the nominating vehicle. A robust designation method is proposed where multiple vehicles can be designated as backup nominees.

Slot reservation schemes resemble the virtual carrier sense network allocation vector (NAV) of carrier sense multiple access collision avoidance (CSMA/CA) schemes in that a node reserves a future time period or slot for its transmissions. Each receiving node remembers these reservations in a database similar to the NAV of the IEEE 802.11 MAC. However, reservation methods have limited scalability. As the number of nodes is increased, the number of slots must be increased thus limiting the size of transmissions. Furthermore, priority will inherently be given to those nodes that reserve their slots first. Additionally, each node has free reign to make reservations at will.

An alternative method of self-organization is for nodes to elect the future transmitting nodes. Election provides prioritization and flexibility as the system is scaled. A disadvantage of elections is significant overhead for the election process. The proposed contention management method is for vehicles to nominate a representative in a manner that eliminates the overhead issue. It is inefficient to have election overhead messaging because it inherently consumes bandwidth and introduces further latency and contention. The proposed alternative is to have a representative vehicle designate (nominate) the next transmitter. An efficient designation method is proposed where transmitting vehicles implicitly designate a subsequent representative in their collective packet transmissions.

Figure 4:
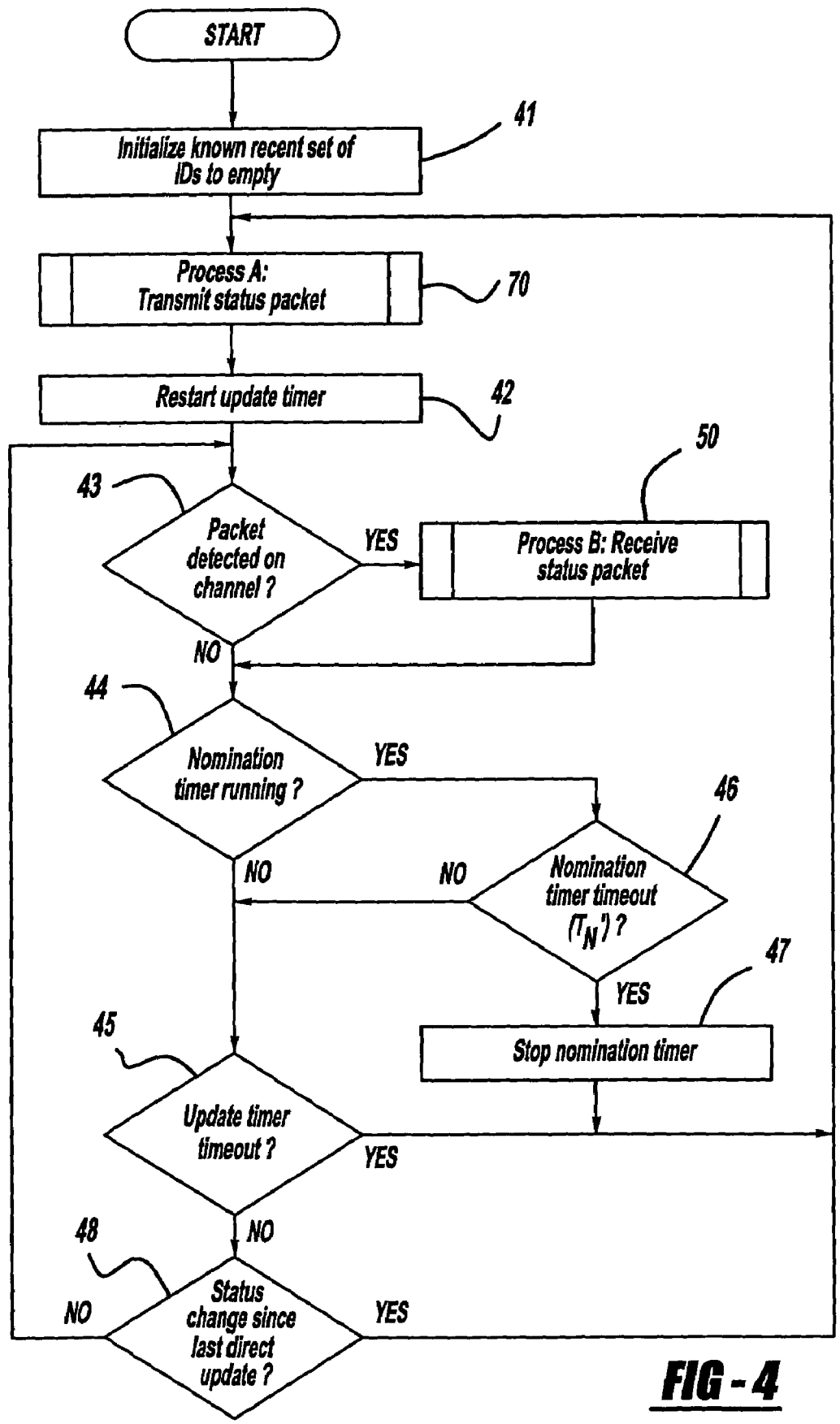
FIGS. 4-6 are flowcharts depicting an exemplary collaborative nomination multicast algorithm according to the principles of the present invention.
Figure 5:
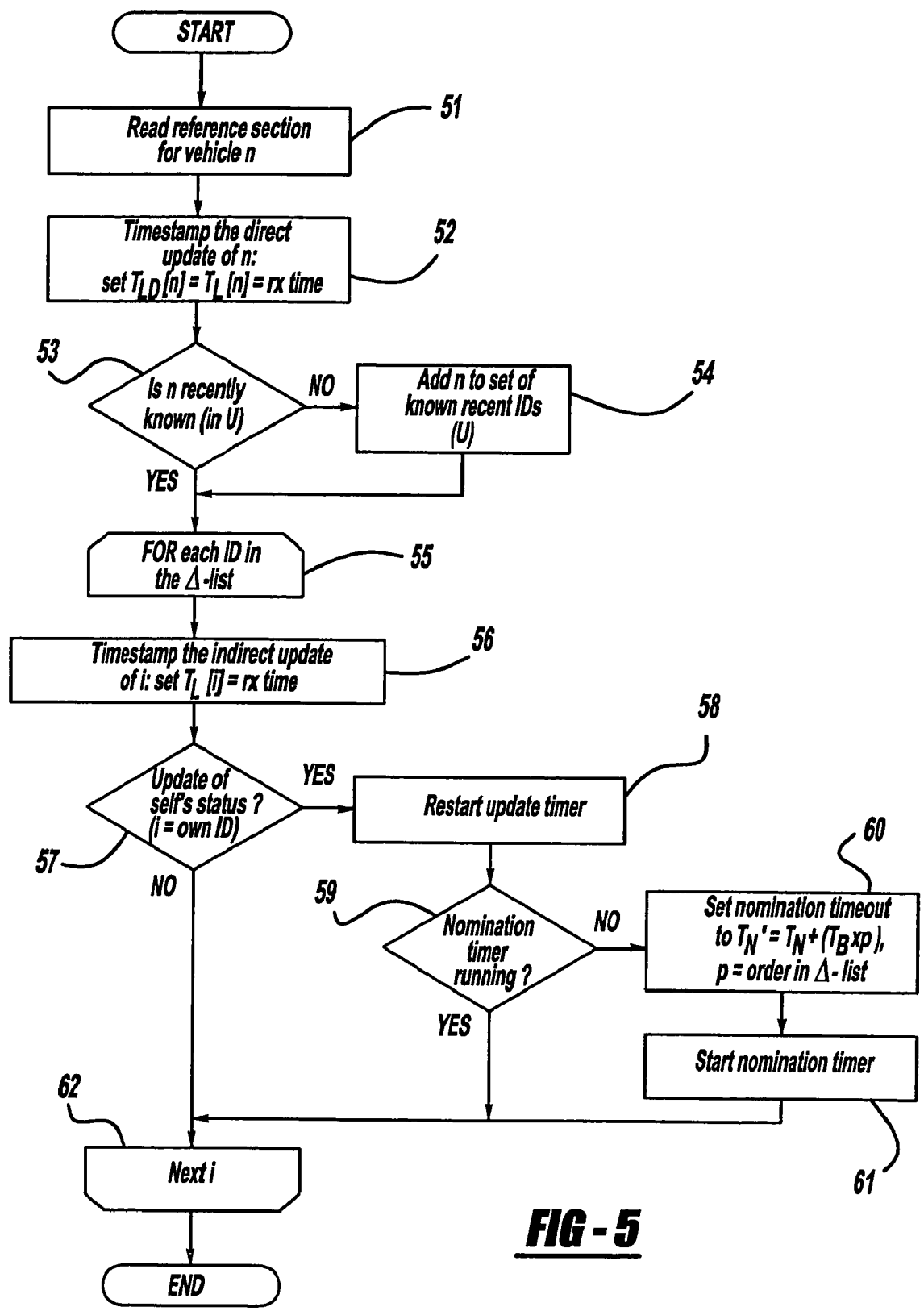
Figure 6:
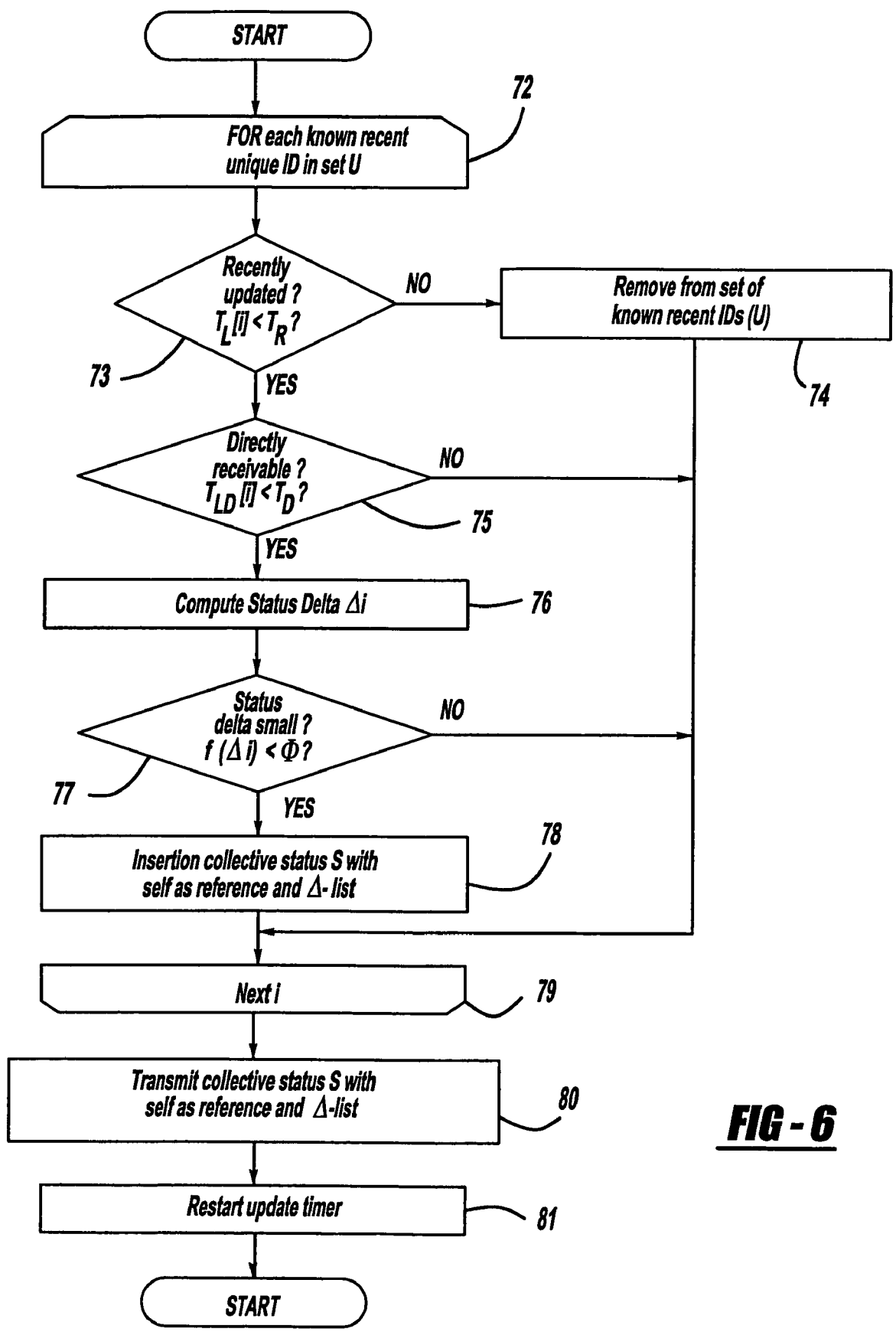

FIGS. 4-6 illustrate an exemplary collaborative nomination multicast algorithm according to the principles of the present invention. It is to be understood that only the relevant steps of the algorithm are discussed in relation to these figures, but that other software-implemented steps may be needed to control and manage the overall operation of an inter-vehicle communication system.

A vehicle's information may be disseminated (updated throughout the network) by its own status transmission or by another vehicle acting as a representative (i.e. that repeats its information in differential form in a collective packet). Each vehicle maintains an update timer that is used to make sure that the vehicle's information is multicast at a predetermined interval.

An update timer is started upon initialization (upon or before the first transmission) and restarted upon either: transmitting a packet as shown at 42 of FIG. 4; or receiving (overhearing) a collective packet that includes the present vehicle's information as shown at 58 of FIG. 5. The timer times out upon reaching a predetermined update expiration. The update expiration time $T_U$ is the maximum time period between status updates. When the timeout occurs, a packet is transmitted and the timer is restarted as indicated at 42, 45 and 72.

Each vehicle also maintains a nomination timer that is used to determine when a vehicle (that has been nominated by another to be a representative) should transmit the next collective packet. The nomination timer is started or restarted upon receiving another node's status transmission that includes the present node's status as shown at 61 of FIG. 5. The timeout value is set depending on whether the vehicle was nominated as a primary representative or one of the backup representatives.

A backup nomination is a vehicle designated to be representative if the primary representative does not transmit within the allocated time. If there are multiple backup designations, each must wait to see if the primary and prior backups fail to transmit. For practical reasons, the detection is not whether or not the primary transmitted but whether the backup vehicle received the primary's transmission regardless of whether the primary heard the nomination or transmitted.

The nomination timer is only used when the vehicle has been designated as primary or a backup. The nomination timer is stopped upon transmitting the single nominated status transmission. The nomination timer timeout $T_N'$ is set depending on the following configurable or predetermined parameters:

$T_N$—Nomination expiration (maximum time between nomination and primary update), $T_B$—Nomination backup period (time between primary and first backup and between subsequent backup designations).

The nomination timer timeout also depends on whether the vehicle was designated as primary, p=0, or backup (secondary), p>0, where p is the implicit order of nominated representatives implied in the received collective packet. If p>0, then the receiving vehicle is the p'th backup. The nomination timer timeout is set as follows: $T_N'=T_N+pT_B$ as shown at 60 of FIG. 5. When the nomination timer timeout occurs the representative vehicle stops the timer and transmits a status packet as shown at 47 of FIG. 4.

With specific reference to FIG. 5, each vehicle monitors the channel(s) to receive transmitted status packets. Upon receipt of a packet, the vehicle reads the reference section at 51 to determine which collaborating vehicle transmitted the packet.

Each vehicle maintains a database of neighboring vehicle status vectors (potentially only for recently updated vehicles or local vehicles). If the packet includes status for a vehicle not maintained in the database, then the vehicle is added to the database as shown at 54.

The database also contains timestamps of the last update for each vehicle's status. Upon receiving a collective packet, a vehicle timestamps the status for each of the vehicles included in the collective transmission. Timestamp for the vehicle which transmitted the packet is updated at 52; whereas, timestamps for each of the remaining vehicles identified in the packet are updated at 56. In other words, separate timestamps are maintained for the last update of a vehicle's information that was received from that vehicle (directly) and the last update of a vehicle's information that was received from another vehicle (indirectly). This distinction enables certain evaluations (e.g., 73 and 75) for selecting vehicles to include in a new packet and the order to include them in as is further explained below.

Upon receiving a collective packet, each vehicle also checks to see if the collective packet contains status for itself (i.e. if the representative vehicle transmitting the packet included status of the receiving vehicle) as indicated at 57. If the packet does contain status for the receiver, then the receiver restarts its update timer at 58 if the status is accurate enough (valid). A configurable accuracy threshold can be used to control the amount of individual corrections and is preferably dependent on the update or nomination intervals since the accuracy of extrapolations is likely proportional to this period. Short periods of 100 ms or less will likely rarely result in any considerable accuracy error when substantial vehicle status is available for the extrapolations.

Additionally, if the collective packet nominates the receiving vehicle, then the receiver checks to see at 59 if a nomination was already made (for example by someone else). If a previous nomination was not received, then the nomination timer is started with the timeout set according to the position of the receiving vehicle in the ordered designation list as shown at 60.

The collective status transmit process is depicted in FIG. 6. The transmitting vehicle is referred to the representative. A vehicle transmits status when either: initializing the process; nomination timer times-out; update timer times-out; or status changes significantly (exceeding a precision or quality required for vehicle safety applications). Determination of whether or not a change is significant can be enhanced through configuration, tuning or adaptation. For example, it may be desirable to adapt a threshold depending on the desired amount of collaboration, bandwidth usage, or precision.

When transmitting status, a vehicle must determine what other vehicles should be included in the status. In an exemplary embodiment, other vehicles should only be included if all of the following conditions are satisfied: the vehicle's status stored by the present representative is current as checked 73 (i.e. updated within a time $T_R$); the vehicle's status was recently received directly from that vehicle as checked at 75 (it is not necessary that the most recent status was directly received), denoted $T_D$ and typically larger than $T_R$.; the vehicle's status can be expressed as a delta (difference from) of the present representative's status and is relatively small as checked at 77; the vehicle's status is reasonably expected to continue to be related to the present representative's status; and the vehicle's status can logistically be included in the collective packet based on any size, timing or other constraints.

Generally speaking, use of all of these conditions are optional. However, it is readily understood that one or more of the conditions may be excluded and/or other conditions may be employed within the scope of the present invention. For example, transmission of a non-current status of another vehicle may not only misrepresent that vehicle's status but may additionally or alternatively conflict with current or non-current status of that same vehicle transmitted by another representative with a different coverage area resulting in further confusion.

There are various alternatives to define what constitutes a relatively large or "significant" vehicle vector delta. A large delta can be defined (i) relative to the protocol fields (the delta exceeds the maximum value that can be expressed by the delta field), (ii) relative to the direction of travel (a vehicle traveling in an opposite or perpendicular direction versus parallel or coincident path), (iii) relative to the future path (a vehicle is traveling slower or faster than required to be expected to be in range in the near future), or by any other method that organizes collaboration in a favorable manner. Configuration or adaptation of an acceptable delta for collaboration can allow for optimization of the level of network cooperation. Even though a vehicle's delta may be too large to include by one vehicle it may be small relative to other vehicles. Consider vehicles traveling in opposite directions on a two-way road where all the vehicles are within radio range. The deltas between vehicles traveling in opposite directions may be too large for inter-lane collaboration. The goal of a collaborative multicast algorithm in this scenario is to organize the collaboration into at least two sets (one for each direction). The streams of periodic transmissions of the self-organized sets share the channel by way of a time offset that automatically results from contention avoidance. If a single vehicle's vector (or other information) is truly unique in the area, then it will transmit its vector periodically at the update rate.

In this exemplary embodiment, the order of the vehicles represented in the collective packet indicates the nomination order to be used by the receiving vehicles. More specifically, the order of the vehicles in the packet may be from the largest to smallest $T_L$. Therefore, the vehicle that has not been heard (i.e., received) from for the longest period of time will be nominated first. Alternatively, the ordering could be based on the direct receive time stamps ($T_{LD}$). In either case, an insertion sort as indicated at 78 can be used to achieve this ordering during creation of the collective status packet. Various other alternatives are also possible including distinguishing between vehicles based on their relative position (whether advantageously positioned to spread a collaborative status), their dynamics (whether in such varied motion that the vehicle will need to transmit anyway), or their stability (whether the status has been contradicted or changed substantially in the recent past). Alternatively, the nominations could be explicitly indicated in the collective packet. It is readily understood that other techniques for determining the nomination order are also within the broader scope of the present invention.

The algorithm and protocol described so far can be used to achieve a range of roughly twice the radio communication range for vehicle status updates. This may be increased beyond twice the radio range if the vehicle topology is sufficiently dynamic. The limit is due to restricting forwarding information to vehicles that have recently been heard from directly.

This limitation can be relaxed safely by flagging less reliable information or "distant" vehicle information. A bit field or mask can be used to accomplish this in the collaborative packet. Alternatively, a hop count can be included per vehicle. This count provides a measure of the distance of the vehicle whose status (position) is reported.

The determination of this count should be done carefully so that a count that is transmitted is the smallest count overheard recently for the vehicle in question, incremented by one. In other words, each vehicle maintains in the neighbor database, for each neighbor, the smallest count received during the last $T_D$ seconds, for example. The count included in the transmitted packet for the vehicle in question is that smallest value incremented by one.

A hop count threshold can be used to limit the extent of forwarding of information for distant vehicles. Essentially, the propagation distance will approach the hop count c multiplied by the maximum radio range r. Therefore, a hop count threshold $\chi'$ can be computed by dividing the desired maximum propagation distance by typical radio range. This method is far more effective than simple flooding since it is a multi-hop extension to the collaboration concept.

Furthermore, collaboration control can be extended by modifying the single-hop direct receive condition ($T_{LD}[i]$ <$T_D$ in FIG. 6). To allow for collaboration with vehicles that are not directly in range, the direct receive condition can be relaxed to permit forwarding of information for vehicles for which information has been received via $\chi$ or fewer hops. It is preferable to use a value for $\chi$ that is less than threshold $\chi'$ because otherwise corrections may not be overheard (i.e. undetected error). The larger the difference ($P_{UE}$) is, the greater the robustness of the system, i.e., $$P_{UE} \propto \chi' - \chi \ \forall \ \chi \leq \chi'. \tag{2}$$

Robustness is achieved by increasing the chance that a correction will propagate to the area within radio range of the forwarder.

Sparse conditions present challenges of propagating information. The collaborative nomination multicast method is robust to such situations because it allows for periodically forwarding information about a vehicle that is no longer in range to vehicles that may have come into range more recently. The time period can be limited to a configurable threshold denoted $T_D$ as described above. Increasing the threshold allows for greater retention and forwarding of information, particularly in sparse or intermittent vehicle traffic. Using the range extension concepts discussed above, the reliability of the retained information can also be quantified and communicated.

As new vehicles come into range of one or more collaborating vehicles, the individual periodic update transmissions of each of those new vehicles will be detected by the collaborative group and those new vehicles will thereby inherently join the group. Status of each new vehicle will be retained and repeated by the group members and that new vehicle will, in turn, be nominated to participate in the collaborative transmissions.

As vehicles depart from a group of collaborating vehicles, they no longer respond to nominations and, within the short nomination backup delay, other vehicles take over.

Collaboration on a linear road segment is only one of the topologies that can be handled by the collaboration method. The algorithm is independent of road shape. Intersections and parking lots present interesting topologies where, if there is substantial traffic, vehicle can extend away from each other in more than 2 immediate directions (i.e. multi-dimensional topologies in terms of paths of vehicle travel). The algorithm is conveniently scalable to such scenarios regardless of paths or dimensions. The effect of such increases in paths or dimensions is that typically this translates to a larger number of groups of collaborating vehicles in range of other groups. However, this increase is limited because the number of groups is limited by the number of multiples of radio range in the area they occupy.

The collaborative nomination multicast method integrates discovery as well as the joining and departing of collaborative members in a local network group and is effective independent of vehicle topology.

Multicast scalability is a key requirement for vehicle safety applications. The present invention provides an efficient solution. This new method provides a means for synchronized dissemination of vehicle-related information either locally or over extended distances independent of vehicle topology. The algorithm can also be used for routing purposes such as route discovery and maintenance.

The method provides robustness to issues such as spoofing and estimation error due to both the direct-receipt principle and correction of incorrect or stale extrapolated status sent by neighbors.

Furthermore, the method requires minimal processing by collaborating vehicles and bandwidth requirements are optimized because the packet load at any point in the network has a constant bound based on the desired update rate (i.e. updates per second) rather than the number of vehicles. Therefore, the bandwidth requirement is largely independent of vehicle density resulting in a highly scalable system in terms of use of the wireless medium.

The method can be gracefully extended to multi-hop providing a wider range of coverage while maintaining the robust self-corrective features. This extension provides superior collaboration and synchronization in wide-area medium access without the need for any admission control.

The method has the ability to adaptively self-organize periodic transmissions in an aggregate manner. This has the added benefit that other periodic or non-periodic applications such as event-driven communications can reliably use the inherently self-organized free slots within the channel created by the method. These slots are inherently created between the periodic nominated transmissions. Thus, the method of the present invention can be used as a time synchronization mechanism to manage multiple application service types in a Time Division Duplex (TDD) mode both reliably and simultaneously.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for disseminating information amongst a plurality of collaborating vehicles in an inter-vehicle communication network, comprising:
   receiving an incoming vehicle communication message at a recipient vehicle from one of the other collaborating vehicles, where the incoming vehicle communication message identifies at least two of the collaborating vehicles;
   nominating one of the collaborating vehicles identified in the incoming vehicle communication message to broadcast a subsequent vehicle communication message; and
   transmitting an outgoing vehicle communication message from the recipient vehicle, where the outgoing vehicle communication message identifies the vehicle nominated to broadcast the subsequent vehicle communication message.

2. The method of claim 1 wherein the incoming vehicle communication message identifies the recipient vehicle as a next vehicle to broadcast the nominating communication message.

3. The method of claim 1 wherein the incoming vehicle communication message includes a reference section for communicating vehicle status information for one of the collaborating vehicles and a differential section for storing vehicle status information for the other collaborating vehicles, where the vehicle status information in the differential section is defines as a differential with the vehicle status information in the reference section.

4. The method of claim 1 wherein the step of nominating further comprises selecting a collaborating vehicle from which a vehicle communication message has not been received from for longest period of time.

5. The method of claim 1 wherein the step of nominating further comprises selecting at least one of the other vehicles identified in the incoming vehicle communication message as a backup to the nominated vehicle.

6. The method of claim 1 wherein transmitting the nominating communication message further comprises delaying a predetermined amount of time before transmitting the outgoing vehicle communication message.

7. The method of claim 6 wherein the predetermined amount of time is correlated to either a time at which the incoming vehicle communication message was received at the recipient vehicle or a time at which the incoming vehicle communication message was transmitted.

8. The method of claim 1 wherein transmitting an outgoing vehicle communication message further comprising providing vehicle status information for collaborating vehicles that are substantially similar to the vehicle status information for the recipient vehicle.

9. The method of claim 8 wherein similarity is based in part on a direction the collaborating vehicles are traveling in relation to the recipient vehicle.

10. The method of claim 1 wherein transmitting an outgoing vehicle communication message further comprising providing vehicle status information for collaborating vehicles having communicated with the recipient vehicle within a predefined time period.

11. The method of claim 1 wherein transmitting an outgoing vehicle communication message further comprising providing vehicle status information for collaborating vehicles whose vehicle status information has been updated within a predefined time period.

12. The method of claim 1 further comprises transmitting the nominating communication message over a wireless communication network.

13. The method of claim 1 wherein transmitting an outgoing vehicle communication message occurs upon expiration of a nomination timer which is set as follows: $T_N = T_N + pT_B$, where $T_N$ is a delay time from being nominated to transmitting a primary update message, $T_B$ is a delay time from the primary update message to a first backup message transmission and each subsequent backup message transmission, and p is a designated backup number.

14. The method of claim 1 wherein transmitting an outgoing vehicle communication message occurs upon expiration of an update timer, where the update timer is correlated to a rate at which the recipient vehicle desires to receive information.

15. A method for disseminating information amongst a plurality of collaborating vehicles in an inter-vehicle communication network, comprising:
   receiving an incoming vehicle communication message at a recipient vehicle from one of the other collaborating vehicles, where the incoming vehicle communication message nominates one of the collaborating vehicles to broadcast a subsequent vehicle communication message and identifies the recipient vehicle as a backup transmitting vehicle;
   resetting a nomination timer to a time that is longer than the time in which the recipient vehicle expects to receive the subsequent vehicle communication message from the nominated vehicle; and
   transmitting a vehicle communication message from the recipient vehicle upon expiration of the nomination timer.

16. The method of claim 15 further comprises nominating one of collaborating vehicles to broadcast a subsequent vehicle communication message and identify the nominated vehicle in the vehicle communication message transmitted from the recipient vehicle.

17. The method of claim 15 wherein the transmitted vehicle communication message includes a reference section for communicating vehicle status information for one of the collaborating vehicles and a differential section for storing vehicle status information for the other collaborating vehicles, where the vehicle status information in the differential section is defined as a differential with the vehicle status information in the reference section.

18. The method of claim 15 wherein the nomination timer is set as follows: $T_N = T_N + pT_B$, where $T_N$ is a delay time from being nominated to transmitting a primary update message, $T_B$ is a delay time from the primary update message to a first backup message transmission and each subsequent backup message transmission, and p is a designated backup number.

* * * * *